March 25, 1941.  J. H. KNOWLES  2,236,434
SEDIMENTATION APPARATUS
Filed Jan. 7, 1939  3 Sheets-Sheet 1

INVENTOR.
JOHN H. KNOWLES,
BY Arthur Middleton
ATTORNEY.

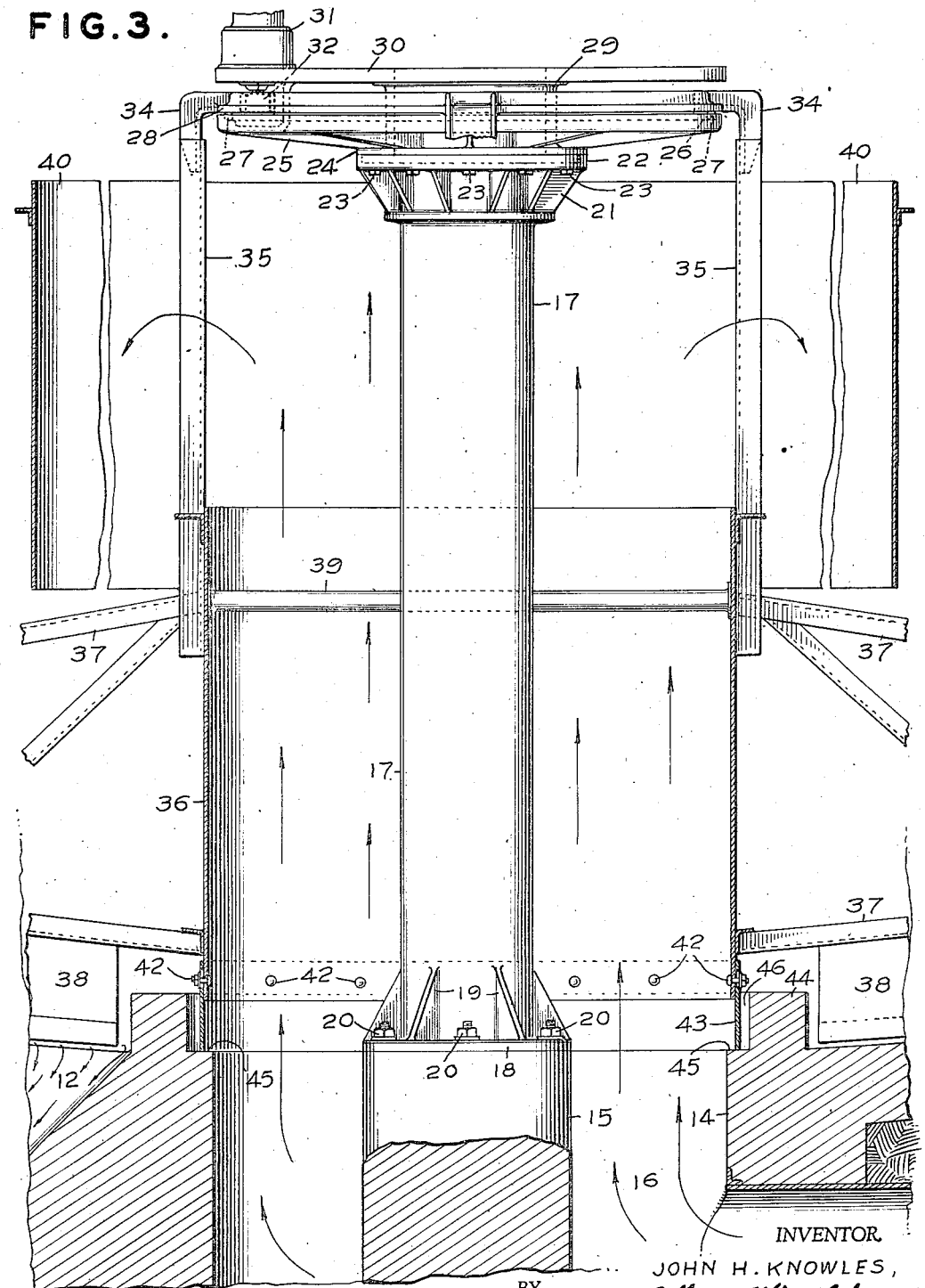

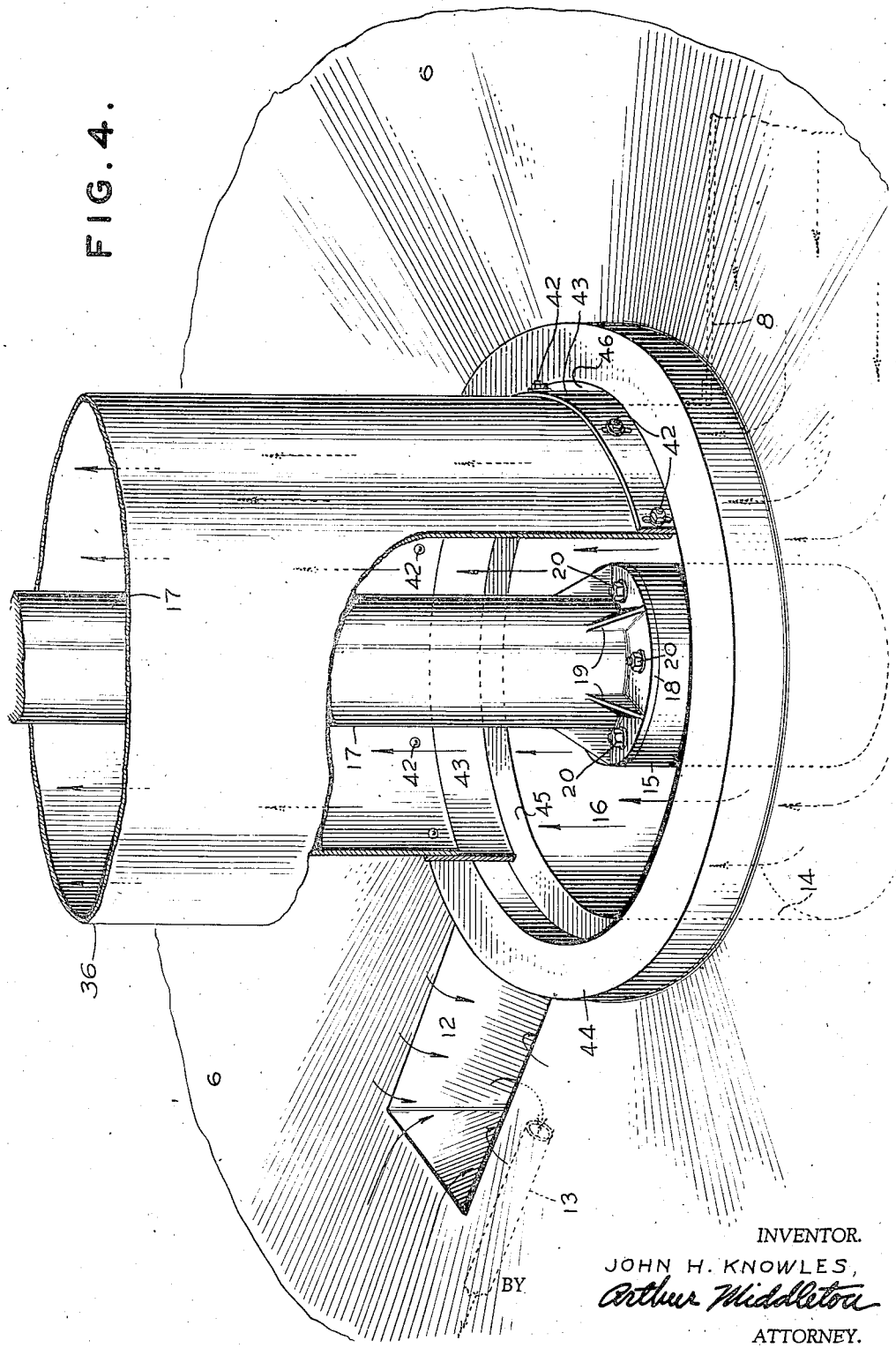

Patented Mar. 25, 1941

2,236,434

UNITED STATES PATENT OFFICE 2,236,434

SEDIMENTATION APPARATUS

John H. Knowles, Larchmont, N. Y.

Application January 7, 1939, Serial No. 249,704

5 Claims. (Cl. 210—55)

This invention relates to sedimentation and similar types of apparatus and, more specifically, to such as settlers, clarifiers, thickeners or decanting tanks as well as sewage sludge digester units. Such apparatus commonly comprises a tank having a feed of incoming liquid and an outflow means for effluent frequently provided by an overflow weir or outlet for clarified effluent. From the liquid usually held quiescently in the tank, suspended solids settle in the form of sediment on the tank bottom. The sediment is impelled to a discharge section, usually to a depressed floor portion or sump, by means of travelling substantially radially extending arms that are equipped with raking blades. Many such tanks or units have the liquid incoming thereto fed through a conduit arrangement that passes under the tank and terminates in a leg upstanding centrally of the tank. This seems to be known currently as a siphon feed although it is perhaps an inverted siphon.

The up-leg or flow delivery terminal of the siphon has been usually embodied in a hollow pier or column extending upwardly from the bottom of the settler tank. The pier or column has also been employed for affording support for the sediment impelling rake arms and the means for rotating them. Such an assembly is shown in the Scott Patent Re. 20,072.

The present invention has for its object the improving or modifying of that arrangement, and the invention hereof may be said to reside in making the boundary wall of the terminal of the incoming feed, rotatable and to carry with it the rake arms, while having it movable around the upstanding pier that supports the rotating members. The invention also involves the conjoint employment of a stationary sealing member and a turnable sealing member cooperatively discouraging substantial leakage of incoming feed from between the fixed and rotating sections of the feed conduit.

For purposes of illustration, I have chosen the best embodiment of the invention now known to me, but it is understood that I do not limit myself to the details thereof other than as set forth in the appended claims, and even then, I reserve the right to equivalents thereof.

It is an object of the present invention to provide a sedimentation apparatus, such as those hereinbefore mentioned having an improved arrangement for incoming feed liquid which is simple, highly efficient in operation and, at the same time, quite economical constructionally.

Another object is to provide a feed arrangement for sedimentation devices which will give increased volumetric flow over feed arrangements of the type previously mentioned with feed delivery terminals of no greater size, and thus insure a more even delivery and distribution of the incoming liquid into the body of the sedimentation device.

A further object is to eliminate costly concrete constructions hereinbefore necessary while at the same time providing a feed arrangement of increased efficiency and of more economical design in and of itself.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

In the drawings—

Fig. 3 is an enlarged vertical section of the feed delivery terminal embodying the features of the invention.

Fig. 4 is an enlarged perspective view, with parts broken away, of the feed delivery terminal and some adjacent parts of the clarifier bottom.

Figure 1:
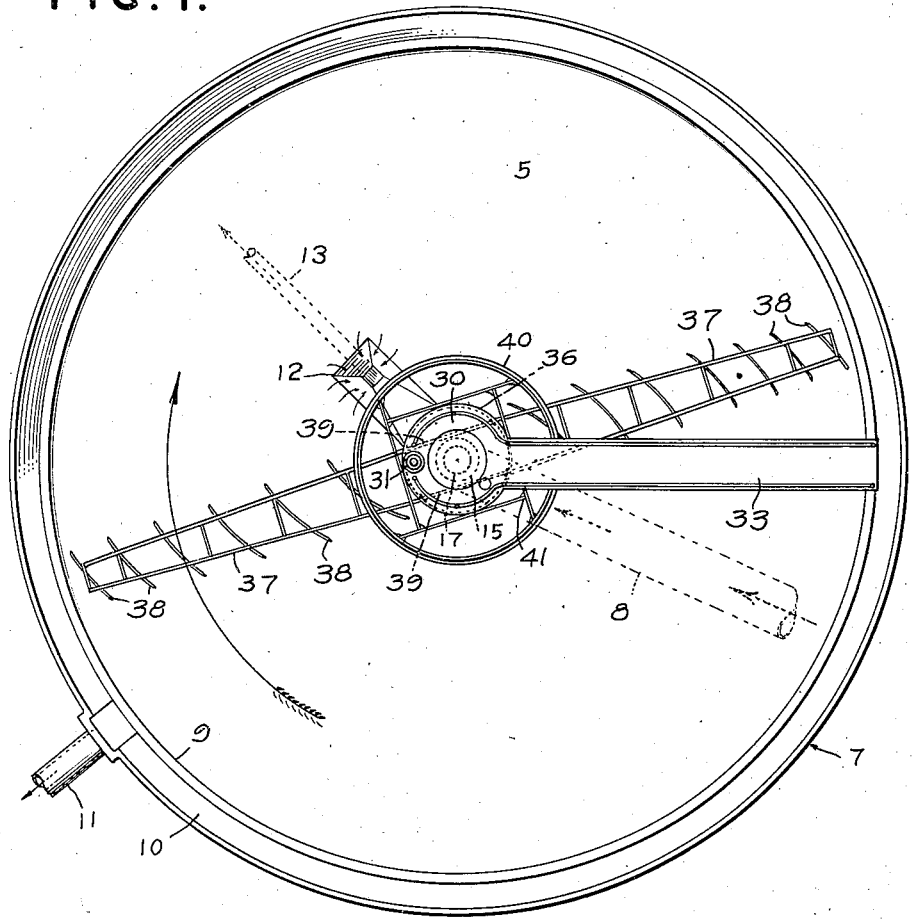
Fig. 1 is a top plan view of a clarifier, preferably of the Dorr type, having a feed arrangement for incoming liquid embodying features of the present invention.

In general, the invention is embodied in a sedimentation tank having a bottom and upstanding side wall, adapted to accommodate a body of liquid under relatively quiescent conditions and provided with a peripheral overflow weir over which clarified supernatant liquor flows as effluent into a launder to be subsequently discharged. The bottom of the tank, preferably adjacent the central portion thereof may be provided with a depressed well or sump for receiving sediment deposited upon the bottom of the tank, otherwise known as sludge. Means are provided for impelling the settled sludge toward the central portion of the tank bottom and directing it generally toward the sump from which it may be withdrawn, continuously or intermittently through a suitable discharge conduit. The sludge impelling means preferably will take the form of radially extending arms provided with curved rake blades, which, incident to rotation of the arms, continuously impel sludge toward the center of the tank and eventually into the sump.

The novel features of the present invention reside in an improved and highly efficient and economical arrangement for conducting and delivering feed liquid into the body of the tank. In the preferred form of the invention there is provided below the bottom of the tank and concentrically therewith a circular well constituting a liquid receiving section for incoming liquid supplied thereto by a conduit extending substantially horizontally underneath the tank bottom.

A stationary and substantially rigid column rises from the center of the well thus providing an annular space between the column and the walls of the well which constitutes the said liquid receiving section. The column extends upwardly and preferably terminates in a flared manner at a point somewhat above the normal liquid level in the tank as determined by the effluent weir. The flared top of this column supports, in rotatable manner, a depending tubular member which extends downwardly substantially to the bottom of the tank and is of approximately the same internal diameter as that of the well or liquid receiving section. The lower portion of the tubular member has a solid wall which defines, with the central column, an annular space through which incoming liquid flows upwardly from the liquid receiving section, while the upper portion of the tubular member has walls which are slitted, preferably vertically or otherwise arranged to permit the upflowing liquid to flow or diffuse outwardly and substantially horizontally. The rake arms previously mentioned are attached to and carried by the tubular member at its lower solid portion and means, such as struts or tie rods, may be provided for strengthening the structure. The flared top of the column carries a motor which, through a suitable train of gearing, rotates the depending tubular member and the rakes carried thereby at a relatively slow and constant speed for impelling settled sludge toward the discharge sump as previously indicated. A vertical cylindrical baffle may surround the upper open portion of the tubular member for directing the flow of incoming liquid downwardly and means may be provided adjacent the lower end of the tubular member for effecting a seal between the same and the contents of the tank.

Referring particularly to the drawings, the reference numeral 5 indicates a sedimentation tank, here illustrated as a clarifier of the Dorr type, having a bottom 6, sloping slightly toward the center, and an upstanding peripheral marginal wall 7. Incoming feed liquid enters the tank centrally thereof through a supply pipe 8, extending horizontally under the tank bottom, clarified effluent passes over the weir 9 into the peripheral launder 10 and discharges through pipe 11, while sludge collected in the sump 12 is withdrawn continuously or intermittently through the sludge discharge pipe 13, all in well-known manner.

In affording the features of the present invention there is provided concentrically of the tank, below the bottom thereof and communicating with the interior thereof, a well 14, which is generally constructed of concrete integral with the bottom wall of the tank. Extending upwardly for a short distance from the bottom of the well 14 and centrally thereof is a base member 15, also preferably of concrete, forming a pedestal for the support of an upstanding stationary column as will be presently described. The annular space defined by the pedestal 15 and the side wall of the well 14 provides a liquid receiving section 16 into which the influent conduit 8 discharges as clearly indicated.

The pedestal 15 supports in stationary and rigid manner an upstanding column 17 which may have, at its lower end, an annular flange 18 strengthened by ribs 19 so that the column may be rigidly and stationarily attached to the pedestal by bolts 20 embedded in the pedestal and passing through the flange 18. The column 17 preferably takes the form of a metal tube. In certain instances it may, if desired, be filled with concrete or other strengthening substance, although the column may be formed entirely of concrete or other substance and be integral with the pedestal 15, although the structure illustrated is that preferred, being highly satisfactory in operation and possessing considerable economic advantage. The column 17 is provided, at its top, with an outwardly flared portion generally indicated at 21 either integral therewith or rigidly attached thereto. The flared portion thus provides a platform 22 of enlarged area for the support of cooperative elements presently to be described.

Figure 2:
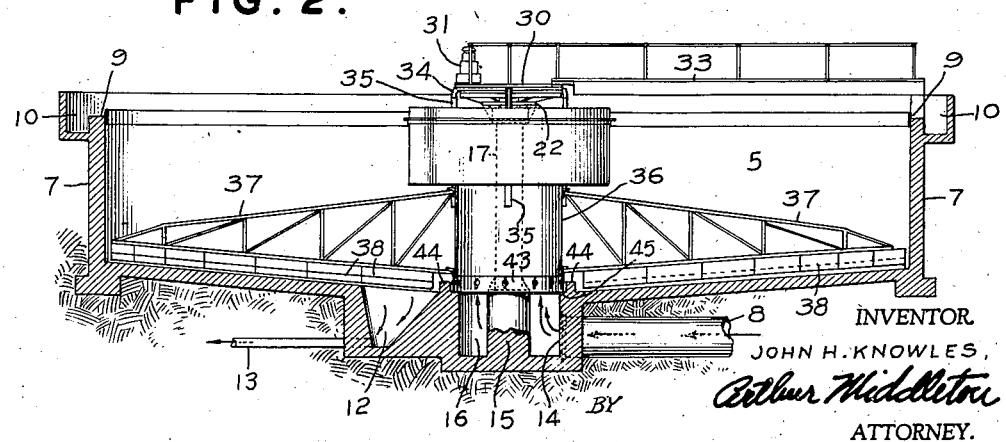
Fig. 2 is a vertical sectional view substantially through a diameter of the clarifier of Fig. 1, the feed arrangement being shown mostly in elevation.

Fixedly attached to the top of the platform 22 by means of bolts 23 is a spider member formed of a base section 24 and spider arms 25 which support at their outer extremities an annular bearing means preferably in the form of a ball race 26 containing the ball bearings 27. The balls 27 support, in rotatable fashion, a rotatable annular member or turntable, taking the form of a bull ring 28 which is provided with gear teeth on its inner annulus. Also rigidly supported from the platform 22 by means of a suitable beam or other type of support 29 is a relatively large platform 30 upon which is mounted a motor 31, preferably of the vertical shaft type, which actuates a pinion 32 in mesh with the gear teeth on the inner annulus of bull ring 28 so as to rotate the same upon the ball bearings 27 at a desired speed. The platform 30 may also support the inner end of a walk-way or bridge 33, seen in Figs. 1 and 2, by means of which access may be had to the platform and its associated mechanisms.

At suitable intervals about the periphery of the bull ring or turntable 28 are rigidly attached elbow members 34 which carry downwardly depending carrying members in the form of angle irons or T-shapes 35. The carrying members 35 are fixedly attached adjacent their lower ends to a tubular member 36 which extends downwardly and terminates a short distance above the bottom of the tank. In the embodiment shown the tubular member 36 is seen to have rigidly attached thereto, at opposite diametrical points, the rake carrying arms 37 which carry the sediment raking blades 38. While the rake arms 37 are shown to be rigidly attached to the rotatable tubular member 36 they may, of course, be carried by the tubular member in other desired manner, for instance, in the horizontally and vertically swinging manner shown in the patent to Scott No. 2,122,383. In the case of rigidly attached raking arms the structure may be strengthened and braced by one or more tie rods or struts 39 extending through the tubular member and rigidly attached to the inside wall of the same at points where the rake arms are joined to the tubular member. Thus the torque, incident to deposited sludge opposing the rotary movement of the raking arms, is transmitted directly through from one arm to the other and thus acts upon the tubular member 36 and its carrying members 35 to only a very limited extent. It is obvious that operation of the motor 31 will rotate the bull ring 28 through cooperation of the pinion 32 and the ring gear which will thus effect rotation of the carrying members 35 and the tubular member 36 to actuate raking arms 37 and cause the blades 38 to impel sedimented material toward the center of the tank and eventually into the sump 12.

It will be seen that the incoming liquid will enter the liquid receiving section 16 from the supply pipe 8 and will then pass upwardly confined within the tubular member 36 until it reaches the upper end of the same which may be at any desired elevation but is preferably below the normal operating liquid level as defined by the overflow weir 9. As the liquid leaves the upper end of the tubular member it will, of course, begin to flow or diffuse outwardly and horizontally substantially as indicated by the arrows in Fig. 3. Instead of the angle irons 35 at relatively widely spaced points for supporting the tubular member 36, the same may be supported by another tubular member having elongated slits to permit the liquid to pass outwardly, or the tubular member 36 may extend upwardly and be joined to the elbows 34, with elongated slits being provided in its upper portion to permit the liquid to flow outwardly and enter the body of the tank. The construction illustrated is that preferred, however, since it offers a free and unobstructed path for the liquid to diffuse outwardly. It is generally preferable to surround the outflow area with suitable baffling means as exemplified by the cylindrical baffle 40 which may be supported from the carrying members 35 by means of framework indicated generally at 41, in Fig. 1. In that construction, of course, the baffle 40 rotates with the tubular member 36 and the carrying members 35. However, the baffle might conveniently be supported in a stationary manner, by suitable means, from the platform 22 or the platform 30, or in any other desired manner. In the latter case it would, of course, not rotate but would remain fixed. The purpose of the baffle 40 is to cause the outwardly diffusing liquid to assume a generally downward path into the body of the tank adjacent the central portion in order to permit the more readily settleable material to deposit on the tank bottom near the central portion thereof and thus eliminate unnecessary raking of that material to a considerable extent.

In order to prevent liquid entering the lower part of the tubular member 36 from the receiving section 16, from escaping below the lower end of the tubular section and entering the tank at that point it is desirable to provide sealing means of some sort, between the lower end of the tubular member 36 and the tank bottom, to prevent the escape of the upflowing liquid in any marked degree. A simple, but at the same time, highly effective sealing means is shown in the drawings wherein the tubular member 36 is seen to terminate a short distance above the tank bottom and above the upper end of the receiving section 16. Adjacent its end the tubular member is provided with a series of openings about its periphery through which extend bolts 42. The shanks of the bolts 42 extend through vertically slotted openings in an apron 43 telescoping about the end of the tubular member. Thus the apron 43 is adapted for limited adjustment in a vertical direction.

To cooperate with the tubular section and the apron 43 there is provided on the tank bottom an upstanding annular curbing 44 which surrounds the upper end of the receiving section 16 and is somewhat spaced laterally therefrom to provide a step or seat 45. It will be seen that the curbing 44 is spaced sufficiently from the edge of the well 14 and with relation to the diameter of the tubular member 36 and apron 43 to insure a small annular space 46 between the outer surface of the apron 43 and the inner vertical face of the curbing. When the machine is erected and before being put into operation, the apron or skirt 43 is adjusted vertically so as to approximately rest on the step or seat 45 but so as not to bind or interfere with free rotation of the mechanism. This in itself, coupled with the tendency of the liquid to continue its upward flow, tends to prevent the escape of liquid past the lower edge of the skirt 43 in any substantial quantities. However, as the sedimentation operation is continued, deposited sediment or sludge will build up on the bottom of the tank and will eventually work its way over the curbing 44 and substantially fill the space 46, thus providing what is generally termed a sludge seal, and effectively prevents the escape of liquid in any substantial quantities past the lower edge of the skirt 43. To the sealing effect of the sludge filling in the cavity 46 is added the balancing effect of the hydraulic pressure within the receiving section 16 and the upflow terminal portion 36, and within the body of the tank. The hydraulic head of the body of liquid within the tank will somewhat balance, or at least oppose to a considerable extent the pressure of the liquid rising within the feed conduit. Thus this small pressure differential plus the sludge seal will very effectively prevent any serious escapage of liquid past the lower edge of the skirt 43.

The construction provided at the lower end of the turnable tubular member or drum 36 on the one hand and at the upper end of the marginal wall of the well or stationary influent pocket section 14 on the other hand, constitutes or provides that which may be referred to as a ring-shaped type of sealing construction. This sealing means embodies in juxtaposed relationship and in cooperative arrangement relatively fixed ring-shaped sealing section or member provided by or at the upper end of said marginal wall and a horizontally-turnable ring-shaped sealing element provided at or by the lower end of the turnable tubular member or drum, 36, to wit, by the vertically adjustable apron or ring 43. The important feature of the construction by which the lower end of the turnable drum and the marginal wall are brought into cooperative relation is that they shall have such proximate arrangement relative to each other whereby as the apparatus functions there is prevented any substantial escape of influent liquid from between the stationary marginal wall on the one hand and the lower end of the turnable drum or tubular carrier on the other hand. The lower end of the tubular carrier is in substantial register with the upper end openings of the well 14 and thus the inflowing liquid passing from the well flows therefrom directly into the lower end of the tubular carrier thence upwardly within the space thereof about the pier to the liquid discharge areas or openings provided in or by the carrier.

As previously indicated, the liquid feeding arrangement described and claimed herein presents a number of marked advantages over prior practices. It is obviously simpler and more economical to construct and install than prior types of feeding arrangements wherein the feed is introduced through an upstanding stationary, hollow concrete column. Furthermore, the stationary hollow columns are necessarily limited in cross-sectional diameter due to constructional difficulties and costs. The upflow feed terminal member of the present invention can be constructed with large diameters at a minimum expense and difficulty to give sufficient cross-sectional areas to provide for large volumes of flow and to insure a laminar and non-turbulent upflow and subsequent diffusion into the contents of the tank. Furthermore, by being able to directly join the inner ends of the rake arms 37 by means of the struts 39, the torque action is carried straight through the center assembly and its effects upon that assembly and the actuating mechanism therefore are reduced to a minimum.

Thus, the sedimentation tank feeding arrangement of the present invention provides a relatively light, efficient and easily fabricated structure, which eliminates former costly construction expenses, which will provide for introducing feed in large flow volumes, which will insure a steady and non-turbulent influx of liquid into the tank, and which possesses other features and advantages which will be apparent to those skilled in the art.

What is claimed is:

1. Sedimentation apparatus comprising a tank having a bottom and sides, an effluent overflow that determines the operating liquid level therein, sediment discharge means, a fixed pier, a turnable member comprising a tubular drum having at the lower portion thereof a ring-shaped sealing element and also having liquid release area, arms extending from the drum and rotating therewith, blades on the arms for acting upon the sediment on the tank bottom, means associated with the pier from which said tubular drum is rotatably supported, a motor and speed-varying devices for motivating said drum, and a fixed conduit for incoming feed having an upflow discharge section disposed at the base of the pier and discharging into the lower end of the tubular drum and having at the upper portion thereof a stationary ring-shaped sealing element that is juxtaposed and cooperatively related to the ring-shaped sealing element of the tubular drum whereby the drum forms a rotatable terminal section of the otherwise fixed conduit and the pier is surrounded by said rotatable terminal section as well as by liquid flowing upwardly through said rotatable terminal section.

2. Sedimentation apparatus comprising a tank having a bottom and sides, an effluent overflow that determines the operating liquid level therein, sediment discharge means, a fixed pier-providing structure, a turnable drum having a release area and a ring-shaped sealing element, arms extending from the drum and turnable therewith, blades on the arms for acting upon sediment on the tank bottom, means associated with the pier-providing structure from which said drum is rotatably supported, a motor, speed-reducing means for actuating said drum from said motor, a fixed pocket-providing section surrounding a lower portion of the pier and having a stationary ring-shaped sealing element juxtaposed with respect to and cooperatively associated with the sealing element of the turnable drum for completing the liquid-sealing structure between the fixed pocket-providing section and the turnable drum, and a conduit in communication with the pocket in the fixed pocket-providing section.

3. A sedimentation apparatus comprising a tank having a bottom and sides, discharge means leading therefrom, a stationary column-providing structure rising from the bottom of the tank, a vertical tubular carrier having liquid release area and having a circular horizontally-turning sealing portion, arms extending laterally from the tubular carrier and disposed for horizontal rotation within the tank about the column of said structure, means associated with the stationary structure and from which said tubular carrier is rotatably supported, means for turning said tubular carrier, and a fixed influent supply section having a fixed ring-shaped sealing portion functionally associated with the circular horizontally-turning portion of the tubular carrier whereby liquid flowing from the fixed influent supply section passes into the tubular carrier and whereby there is substantially prevented leakage of the liquid from between the associated fixed and horizontally-turning sealing portions, in which apparatus the tubular carrier functions not only for supporting and turning the arms, but also to provide a rotatable terminal of the influent supply means, and within which rotatable terminal the inflowing liquid continues to flow upwardly along a passageway in the space left between the interior of the tubular carrier and the exterior of the column to the liquid release area of the carrier.

4. An apparatus of the class described comprising a tank with a bottom construction providing a pocket section open at the top with a stationary sealing portion along the upper margin thereof, a stationary structure comprehending a column extending upwardly from the pocket section and leaving an initial liquid-receiving region within the pocket section, a liquid feed conduit section delivering into said initial liquid-receiving region, a sediment discharge leading from a section of the tank interior that is spaced from the liquid-receiving region, outwardly extending arms functionally disposed within the tank, and a horizontally turnable carrier for said arms mounted so as to derive support from said stationary structure, said carrier having a vertically extending horizontally-turnable tubular body provided at the upper portion thereof with a discharge area leading from the interior thereof and having at the lower portion thereof a turnable sealing portion juxtaposed and cooperatively disposed with respect to the stationary sealing portion so that influent received into the initial liquid-receiving region is compelled to pass therefrom into the lower end of the horizontally-turnable tubular body and upwardly along the upflow space within the tubular body and therefrom through the discharge area into the tank.

5. An apparatus of the class described comprising a continuously operable settling tank with a bottom construction providing a centrally disposed pocket section open at the top with a stationary sealing portion defining the upper margin of the pocket section and an outwardly disposed sediment receiving sump, a stationary structure comprehending a fixed column rising from the floor of the pocket section with an initial liquid-receiving region within the pocket section and about the foot of the column, a stationary liquid feed conduit section leading from below the bottom of the tank and delivering into said initial liquid-receiving region, a sediment discharge pipe leading from the sediment-receiving sump, effluent withdrawal means determining the normal operable liquid level within the tank, outwardly extending arms functionally disposed within the liquid holding section of the tank, a horizontally turnable vertically extending tubular carrier for said arms mounted so as to derive support from said stationary structure, and means for turning said tubular carrier and the arms extending therefrom; said carrier encircling said column and having sufficient internal area to leave an upflow space therein between it and the column, said carrier also being provided at the upper portion thereof with discharge area leading from the interior thereof and at the lower portion thereof with a turnable sealing portion cooperatively disposed with respect to said stationary sealing portion so that influent received into the initial liquid-receiving region passes into the tubular body and therein upwardly along the upflow space within the tubular carrier and then through the discharge area into the liquid holding section of the tank whereby the turnable carrier for the arms also provides a turnable upflow terminal of the conduit by which liquid to be treated is delivered into the tank.

JOHN H. KNOWLES.